Nov. 22, 1927. D. B. SMITH Re. 16,793

CONCRETE FORM TIE AND SPACER

Original Filed April 4, 1925 2 Sheets-Sheet 1

Inventor.
David Baker Smith
Attorney.

Nov. 22, 1927. D. B. SMITH Re. 16,793

CONCRETE FORM TIE AND SPACER

Original Filed April 4, 1925 2 Sheets-Sheet 2

Inventor.
David Baker Smith
Attorney.

Reissued Nov. 22, 1927. Re. 16,793

UNITED STATES PATENT OFFICE.

DAVID BAKER SMITH, OF LOS ANGELES, CALIFORNIA.

CONCRETE-FORM TIE AND SPACER.

Original No. 1,564,982, dated December 8, 1925, Serial No. 20,757, filed April 4, 1925. Application for reissue filed December 27, 1926. Serial No. 157,403.

This invention has to do with tie and spacing devices for concrete forms and the like, and it may be stated as a general object of the invention to provide a form or forms of tie, or tie and spacer, that are simple in structure, economical to manufacture and that present the least possible obstruction when in place in the concrete form.

Although the invention in the specific designs shown and described hereinafter has been applied particularly to the holding of forms for poured concrete, and although it will be understood that the invention is not limited to such use, yet the invention itself will be best understood from a detailed explanation of various forms of devices applied to such particular use. Furthermore in the erection and use of concrete forms, although such forms are not always made of wood, nor are they always made of planks or boards laid in edge to edge abutment, yet the invention may be most readily understood by considering its use as applied to that kind of form. Form elements may, of course, be made in various sizes and shapes and of any suitable material; but for the sake of simplicity I may state at the outset that wherein I refer to form boards I do not thereby mean to limit my invention in its applicability to forms that are constructed of wood.

The devices hereinafter explained in detail are used much in the same manner as those described in issued United States Letters Patent to Henry A. Orlopp and applicant, No. 1,491,413, dated April 22, 1924, and No. 1,468,780, dated September 25, 1923, and in the United States Letters Patent issued to Giles, No. 1,524,926, dated February 3, 1925. Such devices as set out in those patents have given eminent satisfaction in actual use, but are open to come objections—their cost of manufacture and also the fact that when in place in an assembled concrete form (particularly where the form has to stand considerable concrete pressure and therefore the ties have to be closely spaced) the ties more or less obstruct the space within the form and, to a slight degree, hinder free pouring or puddling of the concrete. Also there has been the objection that unless the concrete were poured continuously into an assembled form the concrete from a previous pouring would stand on top those ties that were above the pouring level and, standing sometimes over night, that concrete would become set or partially set before the concrete level had been poured around them. The present invention overcomes all these difficulties and provides a tie, or tie and spacer device, that is very economical to manufacture, light in weight and at the same time capable of taking all stresses that may be imposed upon it.

In speaking of the present invention I may particularly call attention to the fact that the devices may either be merely a tie between opposite walls of concrete form, or they may function both as tie and spacer. The device as hereinafter described comprises a single rod that extends across the form, the rod carrying looped heads to engage the form boards. In a great many cases this rod may function only as a tie rod, and I therefore refer to it as a tension member or tension rod; but at the same time it is in practice made heavy enough and stiff enough to take the compression necessary to hold the form boards apart if there is any tendency for the opposite walls or form boards to move towards each other. Consequently the device is or is capable of being both a tie and spacer, although in the majority of cases it may function only or substantially only as a tie.

Characteristically, the specific forms of the devices explained in detail in the following specification and illustrated in the accompanying drawings, embody a single tension rod extending across the form and a board engaging head formation that may or may not be in a loop formation, but characteristically involve only a single member or part that passes between adjacent edges of abutting form boards.

This application is companion to my application filed on even date herewith, Serial No. 20,756 which has become Pat. No. 1,564,981 and in said companion application, as compared with this one, the characteristic feature is the use of a board engaging head structure that involves a loop or looped formation, or that has two or more spaced parts passing between adjacent edges of abutting form boards. The latter mentioned characteristic forms, in comparison with the present application, a distinct line of cleavage between the two applications; and as to the looped formation the broader claims as between the two applications are contained in said companion application.

For the purpose of making the present invention fully clear to those skilled in this art, I have illustrated in the accompanying drawings various typical and specific forms of devices that embody and are illustrative of the invention; and from consideration of the following detailed descriptions of these various devices the invention itself, as pointed out by the subsequent claims, will be most readily understood: it being understood that I do not go into these specific devices in detail for the purpose of limiting the invention, but merely for the purpose of making the invention clear:

Figure 1:
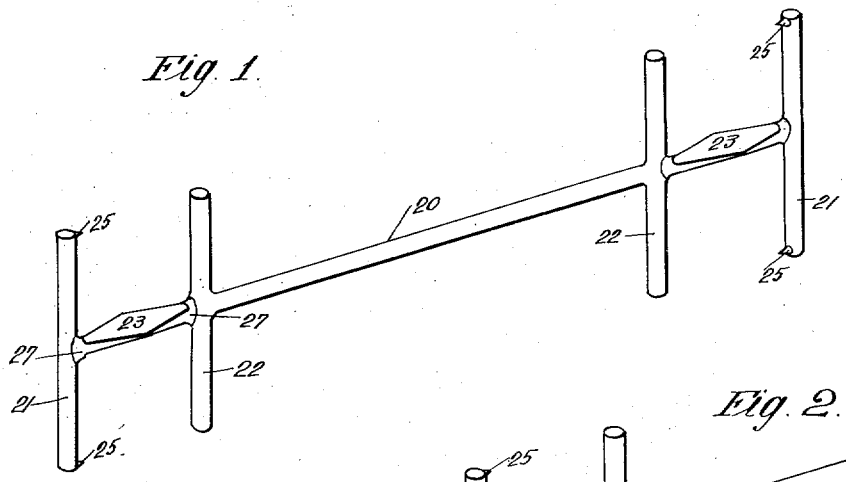
Fig. 1 represents a simple form of device embodying the invention.

Referring first to the form shown in Fig. 1, there is shown at 20 a tension rod having at each end a board engaging head formation that may be described as being substantially H shaped, with two upright members 21 and 22 that cross rod 20 substantially at right angles and joined by a flattened end part or extension of rod 20 as shown at 23. The distance between uprights 21 and 22 may be substantially that necessary to take between them the edges of form boards; but in practice is preferably somewhat greater than the thickness of a form board so that when the device is applied to a form board 24 the edge of the board will lie in a relative position as shown in Fig. 5.

Figure 5:
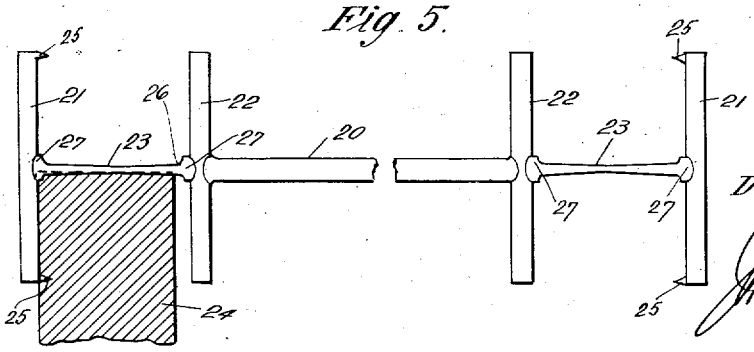
Fig. 5 is a side elevation illustrating for instance the application of the form of Fig. 1 to a form board.

Fig. 5 illustrates one end of the tie device applied over the upper edge of a form board. At the upper and lower ends of outer uprights 21 there are board piercing projections 25 the lower one of which (the one that is lowermost will, of course, depend upon the position of the device) may be forced or hammered into the form board as illustrated in Fig. 5. This prong keeps the device supported horizontally as shown in Fig. 5 when it is applied over the upper edge of a form board at one side of a concrete form being erected. Such concrete forms are preferably erected one side at a time, and it is desirable, as the devices are placed over the edges of a board at one side, to have means that will support the devices and prevent them from falling at their unsupported ends, so that the next successive higher board on the side first being erected may be applied with its lower edge abutting or substantially abutting the upper edge of the board last applied, without the necessity of workmen holding the tie device in proper horizontal position while that next upper board is applied. When the next upper board is applied the flattened part 23 of the device, as will be readily understood, then lies between adjacent longitudinal edges of the two abutting boards, and the free outer or unsupported ends of the device may easily be sprung up or down to allow proper placement of the boards forming the other side of the form. When all the boards are in place it will be seen that the tension rods 20 extend across the interior of the assembled form, that inner uprights 22 prevent the boards falling inwardly and that outer uprights 21 prevent the boards spreading apart. As shown in Fig. 5 inner uprights 22 are spaced inwardly a little distance from the inner surface of the form boards, so that when the concrete is finally poured and the forms removed, then these inner uprights 22 are covered by the finished concrete. In order to remove the form boards it is only necessary to break or shear off the head structure at the point designated 26 in Fig. 5, that being the point of inception of flat 23 and being the point where a pulling action, probably combined with a twisting or bending action, is most likely to break off the head structure.

Flats 23 are so formed as to provide parts that bite or sink into the edges of the form boards. It will be noticed that the rod is so flattened at 23 that its central part is widest and thinnest, while its end parts are narrowest and thickest; furthermore it will be noted that the ends of the flats do not extend quite to points flush with the inner face of the uprights 21 and 22, but that the parts 27 adjacent the uprights are of full thickness (that is, of substantially the same thickness as the tension rod 20). These parts 27 and also the relatively thicker and narrower end parts of flat 23 sink into the edge of the board, as is well illustrated in Fig. 5, and thus perform the function of preventing the device from being displaced longitudinally along the edges of the boards. The adjacent edges of abutting or substantially abutting boards are then separated by an opening whose width is substantially only equal to the thickness of the thinnest part of flats 23; and that dimension is governed by the permissible opening between adjacent edges of form boards which will not allow the poured concrete to run out. As a general rule if a tension rod 20 of circular formation is used, its diameter must be somewhat larger than the permissible width of opening between adjacent boards; and for that reason it is desirable to flatten the end parts or portions of the rod that pass between adjacent boards. And it is also desirable in order to assist in keeping the device in proper position on the boards or between the boards—to assist in preventing the device being displaced from proper position by rotation or twisting about rod 20 as an axis. The board engaging prongs 25 also act in the same capacity in addition to their functions of supporting the device as they are being applied to the form boards and preventing the device from being displaced longitudinally along the edges of the form boards.

Figure 2:
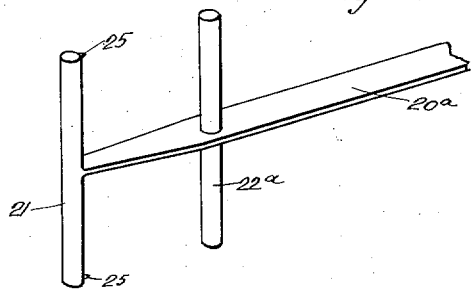
Fig. 2 illustrates a slightly modified board engaging head formation.

In Fig. 2 there is illustrated a form similar to that shown in Fig. 1, but wherein the tension rod $20^a$ is flat throughout in cross section, the outer upright head member 21 joining the end of this rod $20^a$ in much the same fashion as explained in connection with Fig. 1, and the inner upright member $22^a$ passing through the flat rod $20^a$.

Figure 3:
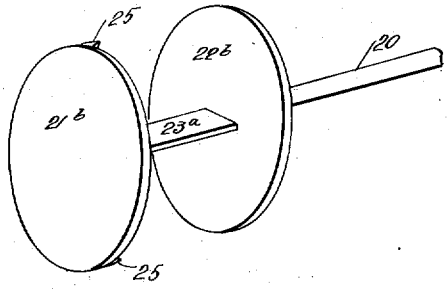
Fig. 3 illustrates a somewhat further modified form.
Figure 4:
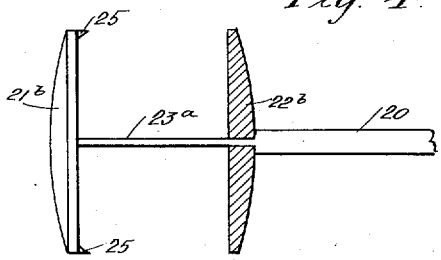
Fig. 4 is a longitudinal elevation with parts in section showing the form shown in Fig. 3.

In Figs. 3 and 4 the inner and outer upright board engaging members $21^b$ and $22^b$, are shown as more or less circular or oval in outline, mounted upon a tension rod 20 that may be flattened as at $23^a$ in space between the members $21^b$ and $22^b$.

In the forms of device so far explained the inner and outer members of the board engaging head formation are either separate members or may be regarded as separate members joined to the longitudinal tension rod as by welding or the like. In Figs. 6 to 9 I have shown forms of device in which the inner and outer members of the board engaging head formation are formed of the same piece of wire or rod that forms the tension rod 20. In this particular instance, the inner and outer member formations may be regarded as loop formations, some of the loops being shown as closed and others open. For instance in Fig. 8 the rod or wire that forms tension rod 20 is shown bending at 30 and passing up and into the upper part 31 of a loop formation that may be described generally as being 8-shaped, and then passing down into the lower part 32 of that 8-shaped loop formation and thence upwardly and, with a bend 33 around the bend 30, into the flattened part 23 that extends across between adjacent edges of abutting form boards, and thence the rod or wire passes through the bend $30^a$ into the upper part $31^a$ of another 8-shaped formation, and thence down into and through the lower part $32^a$ of that formation and thence upwardly to end at 34, where it may be welded to the other parts. Here the inner and outer upright board engaging members of the head are formed in open loop formation and the whole device is formed of a single length of wire or rod. The upper parts 31 and $31^a$ of the head formation are adapted to engage the inner and outer surfaces, respectively, of an upper board while the lower parts 32 and $32^a$ of the formation are adapted to engage the inner and outer surfaces, respectively, of a lower board, between which two boards the flat part 23 lies. This flattened part 23 is similar in formation, structure and function to the flattened part 23 before described. Here, as in the form previously described, the board piercing projections or prong 25 perform the same functions as before stated.

Figure 9:
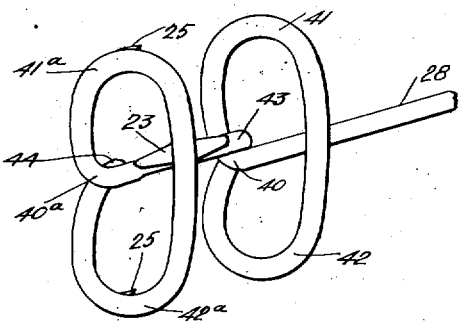

Instead of loops in an 8-shaped formation, I may use loops of generally circular or elliptic or spiral formation, as is indicated in Fig. 9. Here the wire or rod that forms tension rod 20 takes a bend at 40 outwardly and into a plane that lies at right angles to rod 20 and thence upwardly and around to form the upper part 41, and then downwardly and around to form the lower part 42, going back to another bend at 43 around the bend 40 and thence across and through the flattened formation 23 and thence through a bend at $40^a$, upper part $41^a$ and lower part $42^a$ to form an outer board engaging member, the final end of the wire or rod at 44 being welded or otherwise secured to the other parts at about the point $40^a$.

Figure 6:
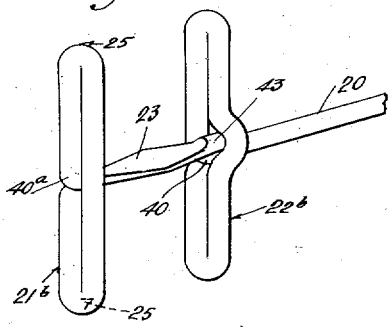
Fig. 6 shows a further modified head formation.

The formation shown in Fig. 6 may be perhaps best understood by saying that it is merely the result of closing down the open loops of Fig. 9 into closed loops as illustrated in Fig. 6, the bends in the wire or rod being the same as in the form of Fig. 9 and being denoted by the same numerals. In the form of Fig. 6, however, it will be noted that the final structure, so far as appearance and general exterior form are concerned, is very similar to that shown in Fig. 1, excepting that both outer and inner uprights $21^b$ or $22^b$ are formed of two thicknesses or lengths of the same wire or rod of which the whole device is formed. The formation of Fig. 6 achieves substantially the same final functional characteristics as the form shown in Fig. 1, and also the same general external formation as in Fig. 1, with the structural difference that the form of Fig. 6 is made from a single piece of wire or rod.

Figure 7:
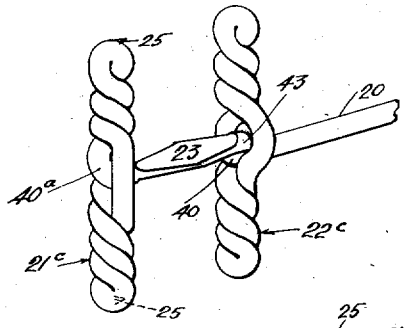
Figs. 7, 8 and 9 show further modifications of the head formation.
Figure 8:
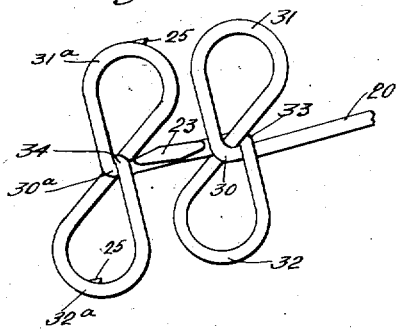

Fig. 7 shows the form that is substantially the form that is shown in Fig. 6, except that here the two parallel wire or rod pieces of the two uprights $21^c$ and $22^c$ are twisted together.

Figure 10:
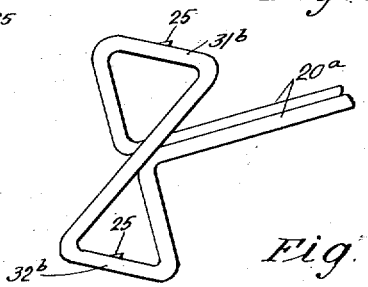
Fig. 10 shows another typical head formation, as for a device to be used as a tie only.

Fig. 10 shows a looped head formation illustrating how the device may be made in a typical form when it is intended to be used as a tie only. And also in this figure is shown how the tension rod $20^a$ may be doubled—that is, may constitute two lengths of the rod or wire of which the device is made. The structure will be apparent from Fig. 10, the looped head being made generally in the shape of an 8 with upper part $31^b$ and lower part $32^b$ adapted to engage the outer side surface of the upper and lower boards, respectively, the two parts being provided with prongs 25.

Figure 11:
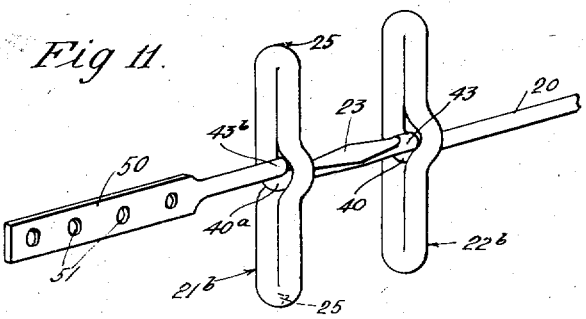
Fig. 11 is a view showing a head formation similar to that shown in Fig. 6 but showing how the tension rod may be extended on beyond the head for certain purposes.

In any of the forms hereinbefore described the tension rod may be extended on outside the head formation for the purpose of securing the rod to a stud or other structural member of the form. The forms usually have vertical studs that bear inwardly against the boards of the outer wall of the form. In such a case, where the extending end of the tie rod is fastened to such a stud, the boards may be pushed in so that they bear against uprights 22, $22^a$ or $22^b$ or the head formation. As an instance of such modification of the structure, I show in Fig. 11 the same form that is shown in Fig. 6, except that the wire or rod of which the device is formed takes a bend at $43^b$ through the loop formation of the outer upright member $21^b$ and extends on out, and preferably flattened as indicated at 50, and may have nail holes as at 51 so that the extension may be wrapped or hooked around a stud or other structural member or may be nailed to it.

I claim:

1. A device of the character described, comprising a tension rod adapted to extend across a concrete form and having at its end a flat part adapted to pass between adjacent edges of abutting form boards, a board engaging head formation extending on opposite sides of the plane of said flat, and means at the ends of said head formation adapted to pierce and engage a form board to prevent displacement of the device, as described.

2. A device of the character described, comprising a tension rod adapted to extend across a concrete form and having at its end a flat part adapted to pass between adjacent edges of abutting form boards, a board engaging head formation embodying two spaced members in planes at right angles to the rod and extending on opposite sides of the plane of said flat, and means at the ends of said head formation adapted to pierce and engage a form board to prevent displacement of the device, as described.

3. A device of the character described, comprising a tension rod adapted to extend across a concrete form and having at its end a flat part adapted to pass between adjacent edges of abutting form boards, a board engaging head formation embodying two members in planes at right angles to the rod, said members being located on the rod at the opposite ends of its flat portion. and extending each on opposite sides of the plane of said flat to engage the inner and outer surfaces of abutting form boards, and the outer one of said members having at its end board piercing projections to prevent displacement of the device, as described.

4. A device of the character described, comprising a tension rod adapted to extend across a concrete form and having at its end a flat part adapted to pass between adjacent edges of abutting form boards, board engaging head formation extending on opposite sides of the plane of said flat, and means at the ends of said head formation adapted to pierce and engage a form board to prevent displacement of the device, as described, said head formation being formed in a single length of metal with the tension rod.

5. A device of the character described, comprising a tension rod adapted to extend across a concrete form and having at its end a flat part adapted to pass between adjacent edges of abutting form boards, a board engaging head formation embodying two members in planes at right angles to the rod, said members being located on the rod at the opposite ends of its flat portion, and extending each on opposite sides of the plane of said flat to engage the inner and outer surfaces of abutting form boards, and the outer one of said members having at its end board piercing projections to prevent displacement of the device, as described, said two spaced head members being formed with the tension rod from a single length of metal.

6. A device of the character described, comprising a tension rod adapted to extend across a concrete form and having at its end a flat part adapted to pass between adjacent edges of abutting form boards, a board engaging head formation extending on opposite sides of the plane of said flat, and means at the ends of said head formation adapted to pierce and engage a form board to prevent displacement of the device, as described, said head formation being formed as loops together with the tension rod from a single length of metal.

7. A device of the character described, comprising a tension rod adapted to extend across a concrete form and having at its end a flat part adapted to pass between adjacent edges of abutting form boards, a board engaging head formation embodying two members in planes at right angles to the rod, said members being located on the rod at the opposite ends of its flat portion, and extending each on opposite sides of the plane of said flat to engage the inner and outer surfaces of abutting form boards, and the outer one of said members having at its end board piercing projections to prevent displacement of the device as described, said two spaced head members being formed as loops together with the tension rod from a single length of metal.

8. A device of the character described, comprising a tension rod adapted to extend across a concrete form and having near its end a flattened part, thinner and wider than the body of the rod, and adapted to pass between adjacent edges of abutting form boards, the cross-sectional area of the flattened part being substantially the same as that of the rod, and a board engaging head formation embodying two members in planes at right angles to the rod, said members being located on the rod at the opposite ends of its said flattened portion, said members being each integrally continuous from end to end and extending each on opposite sides of the plane of said flattened portion to engage the inner and outer surfaces of abutting form boards, and each of said members being at least of the full thickness of said tension rod.

9. A device of the character described, comprising a tension rod adapted to extend across a concrete form and having near its end a flattened part, thinner and wider than the body of the rod, and adapted to pass between adjacent edges of abutting form boards, the cross-sectional area of the flattened part being substantially the same as that of the rod, and a board engaging head formation embodying two members in planes at right angles to the rod, said members being located on the rod at the opposite ends of its said flattened portion, said members being each integrally continuous from end to end, and integral at their centers with said tension rod, and extending each on opposite sides of the plane of said flattened portion to engage the inner and outer surfaces of abutting form boards, and each of said members being of substantially the same thickness as the tension rod.

10. A device of the character described, comprising a tension rod adapted to extend across a concrete form and having near its end a flattened part, thinner and wider than the body of the rod, and adapted to pass between adjacent edges of abutting form boards, the cross-sectional area of the flattened part being substantially the same as that of the rod, and a board engaging head formation embodying two members in planes at right angles to the rod, said members being located on the rod at the opposite ends of its said flattened portion, said members being each integrally continuous and substantially straight from end to end and extending each on opposite sides of the plane of said flattened portion to engage the inner and outer surfaces of abutting form boards, and each of said members being of substantially the same thickness as the tension rod.

11. A unitary form tie and spacer, comprising a rod adapted to extend across a concrete form and having near its end a thin flattened part adapted to pass between adjacent edges of abutting form boards, said flattened part being substantially thinner and wider than remainder of the rod, the cross-sectional area of the flattened part being substantially the same as that of the rod, and comprising a board engaging head formation embodying two members in planes at right angles to the rod located near the opposite ends of the flattened portion and integrally joining with the unflattened part of the rod.

12. A unitary form tie and spacer, comprising a rod adapted to extend across a concrete form and having near its end an integral board engaging head formation comprising a thin flattened portion of the rod adapted to pass between adjacent edges of abutting form boards, and board confining shoulder members near the opposite ends of the flattened part, and joining with the unflattened part of the rod.

13. A unitary form tie and spacer, comprising a tension rod adapted to extend across a concrete form and having near its end a flattened part thinner and wider than the body of the rod and of substantially the same cross-sectional area as the body of the rod, the flattened part ending at a point near but somewhat inside the end of the rod so that the extreme end portion of the rod is left unflattened, and a board engaging head comprising a continuous rod member integrally joined near its center to the unflattened end part of the tension rod and lying at substantially a right angle to the tension rod.

14. A unitary form tie and spacer, comprising a round tension rod adapted to extend across a concrete form and having near its end a flattened part thinner and wider than the body of the rod and of substantially the same cross-sectional area as the body of the rod, the flattened part ending at a point near but somewhat inside the end of the rod so that the extreme end portion of the rod is left unflattened, and a board engaging head comprising a continuous rod member integrally joined near its center to the unflattened end part of the tension rod and lying at substantially a right angle to the tension rod, said head being composed of a round rod of the same size as the tension rod.

In witness that I claim the foregoing I have hereunto subscribed my name, this 18th day of December, 1926.

DAVID BAKER SMITH.